United States Patent
Reinker et al.

(10) Patent No.: US 12,304,484 B2
(45) Date of Patent: May 20, 2025

(54) VIRTUAL TETHERING FOR AUTONOMOUS CONVOY

(71) Applicant: GM GLOBAL TECHNOLOGY OPERATIONS LLC, Detroit, MI (US)

(72) Inventors: Michael J Reinker, Beverly Hills, MI (US); Ethan Thomas Dietrich, Oak Park, MI (US); Constandi J Shami, Ann Arbor, MI (US); Reza Zarringhalam, Whitby (CA); Milad Jalaliyazdi, Richmond Hill (CA); Benjamin L Williams, Milford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 272 days.

(21) Appl. No.: 18/176,810

(22) Filed: Mar. 1, 2023

(65) Prior Publication Data

US 2024/0294167 A1 Sep. 5, 2024

(51) Int. Cl.
*B60W 30/165* (2020.01)
*B60W 30/18* (2012.01)
(Continued)

(52) U.S. Cl.
CPC .... *B60W 30/165* (2013.01); *B60W 30/18163* (2013.01); *B60W 50/14* (2013.01);
(Continued)

(58) Field of Classification Search
CPC ......... B60W 30/165; B60W 30/18163; B60W 50/14; B60W 60/001; B60W 2540/215;
(Continued)

(56) References Cited

U.S. PATENT DOCUMENTS

2014/0303870 A1* 10/2014 Switkes ............... G05D 1/0217
701/96
2017/0344023 A1* 11/2017 Laubinger ........... B60W 30/165
(Continued)

FOREIGN PATENT DOCUMENTS

| CN | 115320592 A | * | 11/2022 | |
|---|---|---|---|---|
| WO | WO-2021110638 A1 | * | 6/2021 | ............ B60W 30/16 |
| WO | WO-2021165253 A1 | * | 8/2021 | ............ B60W 30/12 |

*Primary Examiner* — Erin M Piateski
*Assistant Examiner* — Ashley Tiffany Schoech
(74) *Attorney, Agent, or Firm* — Lorenz & Kopf LLP

(57) ABSTRACT

A method in a vehicle, includes: providing, via an HMI, a request to be followed indication responsive to receipt of a request to be followed from a following vehicle; providing, via the HMI, a request to enter a tether operating mode; entering the tether operating mode and selecting a tether goal between the lead vehicle and the following vehicle; providing, via the HMI, a tether mode indication that indicates that the lead vehicle is in the tether operating mode; monitoring a headway between the lead vehicle and following vehicle; adjusting a preplanned trajectory calculated by a driver assistance system to facilitate the following vehicle obtaining and maintaining the tether goal; modifying driver assistance system operation based on a level at which the headway is greater than the tether goal; and generating control signals for vehicle actuators to control the lead vehicle to facilitate the following vehicle maintaining the tether goal.

20 Claims, 7 Drawing Sheets

(51) Int. Cl.
*B60W 50/14* (2020.01)
*B60W 60/00* (2020.01)

(52) U.S. Cl.
CPC ..... *B60W 60/001* (2020.02); *B60W 2540/215* (2020.02); *B60W 2552/05* (2020.02); *B60W 2556/65* (2020.02); *B60W 2720/106* (2013.01)

(58) Field of Classification Search
CPC ....... B60W 2556/65; B60W 2720/106; B60W 2754/30; B60W 2050/146; B60W 2420/403; B60W 2420/408; B60W 2556/40; G08G 1/22; B61L 25/025
See application file for complete search history.

(56) References Cited

U.S. PATENT DOCUMENTS

| | | | |
|---|---|---|---|
| 2018/0188746 A1* | 7/2018 | Lesher | G05D 1/0217 |
| 2019/0217861 A1* | 7/2019 | Kurahashi | B60W 30/165 |
| 2022/0327935 A1* | 10/2022 | Guney | G05D 1/247 |
| 2023/0169864 A1* | 6/2023 | Kim | G08G 1/166 |
| 2024/0001920 A1* | 1/2024 | Katayama | B60W 50/082 |

* cited by examiner

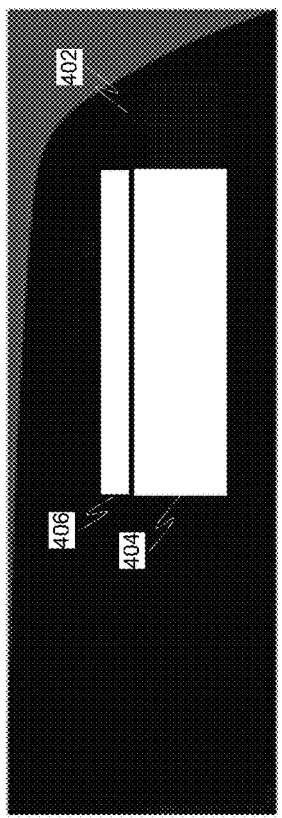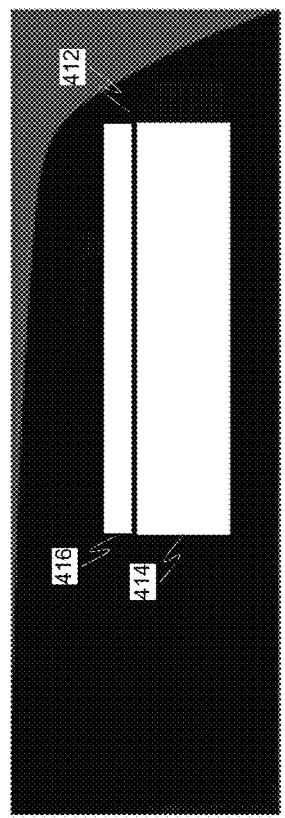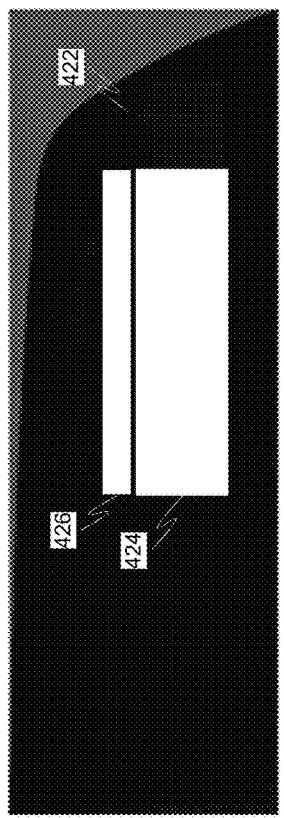

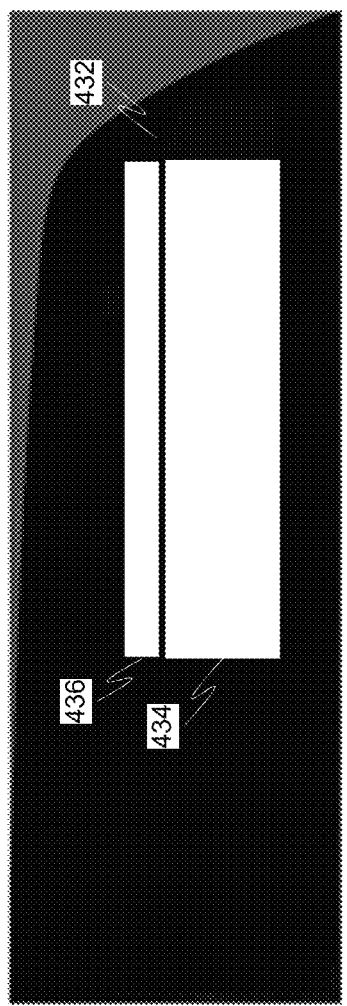
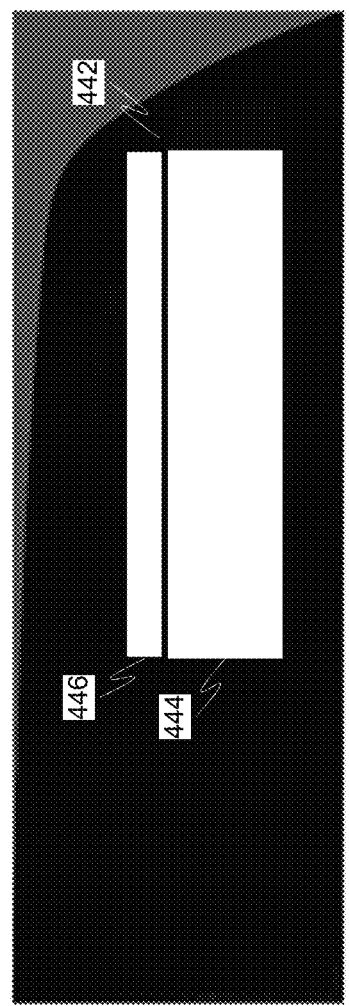
FIG. 4D
FIG. 4E

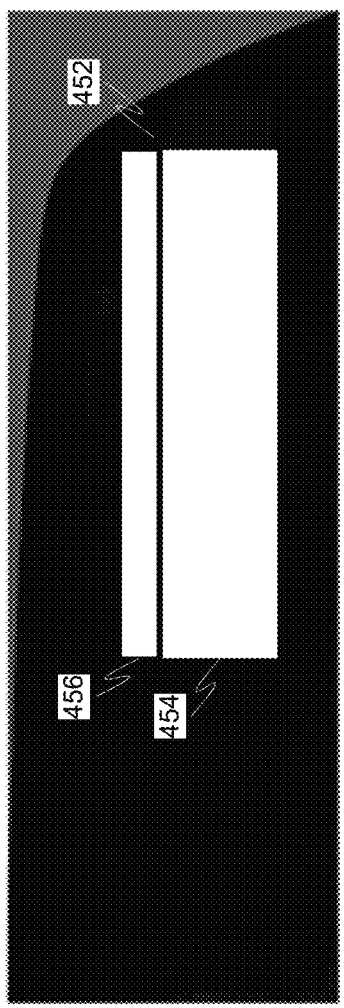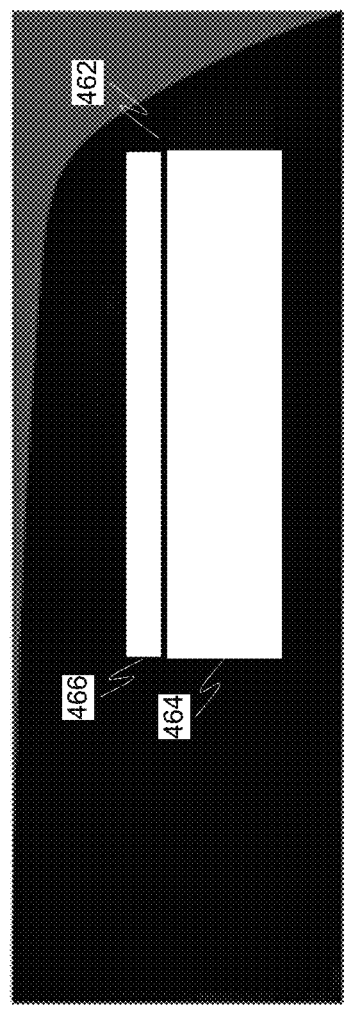

VIRTUAL TETHERING FOR AUTONOMOUS CONVOY

INTRODUCTION

The technical field generally relates to systems, methods, and apparatuses for providing driver assistance during vehicle operations and more particularly relates to systems, methods, and apparatuses for providing autonomous or semi-autonomous driving assistance during vehicle operations.

Driving assistance features are being implemented in modern automotive vehicles. Features such as route following and lane keeping assistance are under continued development. Further driver assistance improvements can decrease the workload for vehicle operations.

It is therefore desirable for methods, systems, and apparatuses for providing driver assistance improvements. Furthermore, other desirable features and characteristics of the present disclosure will become apparent from the subsequent detailed description and the appended claims, taken in conjunction with the accompanying drawings and the foregoing technical field and background.

The information disclosed in this introduction is only for enhancement of understanding of the background of the present disclosure and therefore it may contain information that does not form the prior art that is already known in this country to a person of ordinary skill in the art.

SUMMARY

Disclosed herein are vehicles with, methods for, and systems for driving assistance. In some aspects, the techniques described herein relate to a lead vehicle including: a sensor system including onboard vehicle sensors; an actuator system including vehicle actuators; a human machine interface (HMI); and a controller for implementing a driver assistance system, the controller configured to: provide, via the HMI for lead vehicle operator acceptance, a request to be followed indication responsive to receipt of a request to be followed from a following vehicle; provide, via the HMI for lead vehicle operator acceptance, a request to enter a tether operating mode responsive to acceptance of the request to be followed; enter the tether operating mode and select a tether goal (e.g., close headway, medium headway, or far headway measured in time or distance) between the lead vehicle and the following vehicle responsive to lead vehicle operator acceptance of the request to be tethered; provide, via the HMI, a tether mode indication that indicates that the lead vehicle is in the tether operating mode; monitor a headway (e.g., distance or time headway) between the lead vehicle and following vehicle using one or more of the onboard vehicle sensors (e.g., cameras, radars, LIDAR) and vehicle telematics (e.g., GPS); adjust a preplanned trajectory calculated by the driver assistance system to facilitate the following vehicle obtaining and maintaining the tether goal; modify driver assistance system operation in lead vehicle based on a level at which the headway (e.g., distance or time headway) is greater than the tether goal when in the tether operating mode; exit the tether operating mode based on lead vehicle operator override action; and generate control signals for the vehicle actuators to control the lead vehicle to facilitate the following vehicle obtaining and maintaining the tether goal.

In some aspects, the techniques described herein relate to a lead vehicle, wherein the controller is further configured to receive via a vehicle-to-vehicle (V2V) communication interface the request to be followed from the following vehicle.

In some aspects, the techniques described herein relate to a lead vehicle, wherein: the request to be followed indication includes a first graphical indication displayed on an HMI display screen; the request to be tethered indication includes a second graphical indication displayed on an HMI display screen; and the tether mode indication includes a third graphical indication displayed on an HMI display screen wherein the first, second, and third graphical indications are different.

In some aspects, the techniques described herein relate to a lead vehicle, wherein the controller is further configured to: receive lead vehicle operator acceptance of the request to be followed; and cause an acceptance of the request to be followed indication to be provided to the following vehicle.

In some aspects, the techniques described herein relate to a lead vehicle, wherein the controller is further configured to: receive lead vehicle operator acceptance of the request to be tethered; and cause an acceptance of the request to be tethered indication to be provided to the following vehicle.

In some aspects, the techniques described herein relate to a lead vehicle, wherein the controller is further configured to communicate planned trajectory information (e.g., upcoming maneuvers over next several seconds such as a planned lane change, a planned velocity change, a planned sharp turn, etc.) of the lead vehicle to the following vehicle.

In some aspects, the techniques described herein relate to a lead vehicle, wherein the controller is further configured to communicate navigational information (e.g., take next exit in a mile) to the following vehicle when in the tether operating mode.

In some aspects, the techniques described herein relate to a lead vehicle, wherein to adjust a preplanned trajectory the controller is configured to perform one or more of: generate control signals to modify speed of lead vehicle (e.g., slow down) when approaching an intersection; execute a lane change only when both vehicles can safely execute the lane change; stop earlier for yellow lights; reduce maximum longitudinal acceleration; limit lane changes when following vehicle is in same lane; and encourage lane changes when following vehicle is in an adjacent lane.

In some aspects, the techniques described herein relate to a lead vehicle, wherein to modify driver assistance system operation based on a level at which the headway is greater than the tether goal the controller is configured to perform one or more of: provide, via the HMI, a first tether warning when the headway is at a first predetermined level (e.g., 50%) greater than the tether goal; limit vehicle commanded acceleration when the headway is at a second predetermined level (e.g., 75%) greater than the tether goal; and disengage from tether operating mode when the headway is at a third predetermined level (e.g., 100%) greater than the tether goal.

In some aspects, the techniques described herein relate to a lead vehicle, wherein: to provide a first tether warning the controller is configured to provide, via the HMI, an alert that one or more of a current set speed and a driver override are leading to increasing distance headway; and the controller is further configured to provide, via the HMI, a tether mode disengaged indication that indicates that the tether operating mode has been disengaged.

In some aspects, the techniques described herein relate to a method in a lead vehicle, including: providing, via a human machine interface (HMI) in the lead vehicle for lead vehicle operator acceptance, a request to be followed indication responsive to receipt of a request to be followed from a following vehicle; providing, via the HMI for lead vehicle operator acceptance, a request to enter a tether operating mode responsive to acceptance of the request to be followed; entering the tether operating mode and selecting a tether goal between the lead vehicle and the following vehicle responsive to lead vehicle operator acceptance of the request to be tethered; providing, via the HMI, a tether mode indication that indicates that the lead vehicle is in the tether operating mode; monitoring a headway between the lead vehicle and following vehicle using one or more onboard vehicle sensors and vehicle telematics when in the tether operating mode; adjusting a preplanned trajectory calculated by a driver assistance system in the lead vehicle to facilitate the following vehicle obtaining and maintaining the tether goal when in the tether operating mode; modifying driver assistance system operation in the lead vehicle based on a level at which the headway is greater than the tether goal when in the tether operating mode; generating control signals for vehicle actuators to control the lead vehicle to facilitate the following vehicle obtaining and maintaining the tether goal; and exiting the tether operating mode based on lead vehicle operator override action.

In some aspects, the techniques described herein relate to a method, further including receiving receive via a vehicle-to-vehicle (V2V) communication interface the request to be followed from the following vehicle.

In some aspects, the techniques described herein relate to a method, wherein: the request to be followed indication includes a first graphical indication displayed on an HMI display screen; the request to be tethered indication includes a second graphical indication displayed on an HMI display screen; and the tether mode indication includes a third graphical indication displayed on an HMI display screen.

In some aspects, the techniques described herein relate to a method, further including: receiving lead vehicle operator acceptance of the request to be followed; and causing an acceptance of the request to be followed indication to be provided to the following vehicle.

In some aspects, the techniques described herein relate to a method, further including: receiving lead vehicle operator acceptance of the request to be tethered; and causing an acceptance of the request to be tethered indication to be provided to the following vehicle.

In some aspects, the techniques described herein relate to a method, further including communicating planned trajectory information of the lead vehicle to the following vehicle when in the tether operating mode.

In some aspects, the techniques described herein relate to a method, further including communicating navigational information to the following vehicle when in the tether operating mode.

In some aspects, the techniques described herein relate to a method, wherein adjusting a preplanned trajectory includes one or more of: modifying driving behavior of lead vehicle when approaching an intersection; executing a lane change only when both vehicles can safely execute the lane change; stopping earlier for yellow lights; reducing maximum longitudinal acceleration; limiting lane changes when following vehicle is in same lane; and encouraging lane changes when the following vehicle is in an adjacent lane.

In some aspects, the techniques described herein relate to a method, wherein modifying driver assistance system operation based on a level at which the headway is greater than the tether goal includes one or more of: providing, via the HMI, a first tether warning when the headway is a first predetermined level greater than the tether goal; limiting vehicle commanded acceleration when the headway is a second predetermined level greater than the tether goal; and disengaging from tether operating mode when the headway is a third predetermined level greater than the tether goal.

In some aspects, the techniques described herein relate to a controller in a lead vehicle for implementing a driver assistance system, the controller configured to: provide, via a human machine interface (HMI) in the lead vehicle for lead vehicle operator acceptance, a request to be followed indication responsive to receipt of a request to be followed from a following vehicle; provide, via the HMI for lead vehicle operator acceptance, a request to enter a tether operating mode responsive to acceptance of the request to be followed; enter the tether operating mode and select a tether goal between the lead vehicle and the following vehicle responsive to lead vehicle operator acceptance of the request to be tethered; provide, via the HMI, a tether mode indication that indicates that the lead vehicle is in the tether operating mode; monitor a headway between the lead vehicle and following vehicle using one or more onboard vehicle sensors and vehicle telematics when in the tether operating mode; adjust a preplanned trajectory calculated by a driver assistance system in the lead vehicle to facilitate the following vehicle obtaining and maintaining the tether goal when in the tether operating mode; modify driver assistance system operation in the lead vehicle based on a level at which the headway is greater than the tether goal when in the tether operating mode; exit the tether operating mode based on lead vehicle operator override action; and generate control signals for vehicle actuators to control the lead vehicle to facilitate the following vehicle obtaining and maintaining the tether goal.

In some aspects, the techniques described herein relate to a controller that is further configured to receive via a vehicle-to-vehicle (V2V) communication interface the request to be followed from the following vehicle.

In some aspects, the techniques described herein relate to a controller, wherein: the request to be followed indication includes a first graphical indication displayed on an HMI display screen; the request to be tethered indication includes a second graphical indication displayed on an HMI display screen; and the tether mode indication includes a third graphical indication displayed on an HMI display screen wherein the first, second, and third graphical indications are different.

In some aspects, the techniques described herein relate to a controller that is further configured to: receive lead vehicle operator acceptance of the request to be followed; and cause an acceptance of the request to be followed indication to be provided to the following vehicle.

In some aspects, the techniques described herein relate to a controller that is further configured to: receive lead vehicle operator acceptance of the request to be tethered; and cause an acceptance of the request to be tethered indication to be provided to the following vehicle.

In some aspects, the techniques described herein relate to a controller that is further configured to communicate planned trajectory information (e.g., upcoming maneuvers over next several seconds such as a planned lane change, a planned velocity change, a planned sharp turn, etc.) of the lead vehicle to the following vehicle.

In some aspects, the techniques described herein relate to a controller that is further configured to communicate navigational information (e.g., take next exit in a mile) to the following vehicle when in the tether operating mode.

In some aspects, the techniques described herein relate to a controller, wherein to adjust a preplanned trajectory the controller is configured to perform one or more of: generate control signals to modify speed of lead vehicle (e.g., slow down) when approaching an intersection; execute a lane change only when both vehicles can safely execute the lane change; stop earlier for yellow lights; reduce maximum longitudinal acceleration; limit lane changes when following vehicle is in same lane; and encourage lane changes when following vehicle is in an adjacent lane.

In some aspects, the techniques described herein relate to a controller, wherein to modify driver assistance system operation based on a level at which the headway is greater than the tether goal the controller is configured to perform one or more of: provide, via the HMI, a first tether warning when the headway is at a first predetermined level (e.g., 50%) greater than the tether goal; limit vehicle commanded acceleration when the headway is at a second predetermined level (e.g., 75%) greater than the tether goal; and disengage from tether operating mode when the headway is at a third predetermined level (e.g., 100%) greater than the tether goal.

In some aspects, the techniques described herein relate to a controller, wherein: to provide a first tether warning the controller is configured to provide, via the HMI, an alert that one or more of a current set speed and a driver override are leading to increasing distance headway; and the controller is further configured to provide, via the HMI, a tether mode disengaged indication that indicates that the tether operating mode has been disengaged.

BRIEF DESCRIPTION OF THE DRAWINGS

The exemplary embodiments will hereinafter be described in conjunction with the following drawing figures, wherein like numerals denote like elements, and wherein:

FIGS. 4A-4G are diagrams depicting example interface screens of an example HMI provided by an example autonomous driving system to communicate information to a vehicle operator, in accordance with various embodiments.

DETAILED DESCRIPTION

Figure 1:
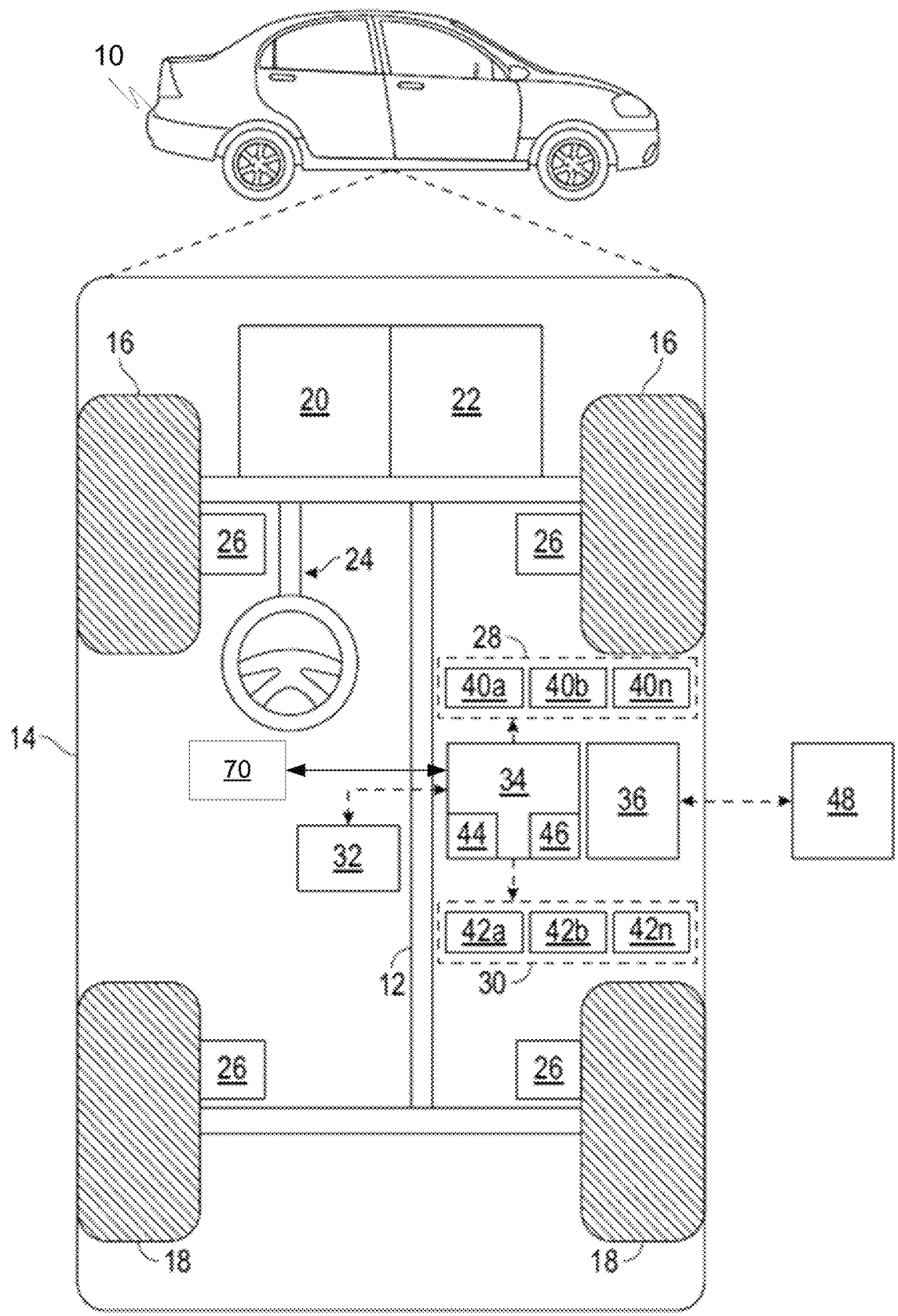
FIG. 1 is a diagram depicting an example vehicle that includes a driver assistance system, in accordance with various embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

In various embodiments, apparatus, systems, techniques, and articles are disclosed for an autonomous driving feature wherein a lead (e.g., host) vehicle leads a following vehicle using maneuvering modifications that make it easier for the following vehicle to follow the lead vehicle. The disclosed apparatus, systems, techniques, and articles provide the lead vehicle operator with a human machine interface (HMI) for accepting a request to be followed, accepting a request to be tethered, and providing a notification that the lead vehicle is in a tether operating mode wherein maneuvering modifications are made to make it easier for the following vehicle to follow the lead vehicle. In various embodiments, the disclosed apparatus, systems, techniques, and articles provide a tether operating mode for autonomous operation wherein the lead vehicle sets a tether goal (e.g., close, medium, far measured in terms of distance and/or time), monitors a headway (e.g., longitudinal gap measured in terms of distance and/or time) between the lead vehicle and following vehicle, adjusts a preplanned trajectory calculated by a driver assistance system in the lead vehicle to facilitate the following vehicle obtaining and maintaining the tether goal; modify driver assistance system operation in the lead vehicle based on a level at which the headway is greater than the tether goal; and generate control signals for vehicle actuators to control the lead vehicle to facilitate the following vehicle obtaining and maintaining the tether goal.

FIG. 1 is a diagram depicting an example vehicle 10 that includes an autonomous driving system (ADS) 70 for providing hands free driving features for the vehicle. As depicted in FIG. 1, the example vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. The vehicle 10 is depicted in the illustrated embodiment as a passenger car, but other vehicle types, including trucks, sport utility vehicles (SUVs), recreational vehicles (RVs), etc., may also be used. The vehicle 10 is capable of being driven manually, autonomously and/or semi-autonomously.

The vehicle 10 further includes a propulsion system 20, a transmission system 22 to transmit power from the propulsion system 20 to vehicle wheels 16-18, a steering system 24 to influence the position of the vehicle wheels 16-18, a brake system 26 to provide braking torque to the vehicle wheels 16-18, a sensor system 28, an actuator system 30, at least one data storage device 32, at least one controller 34, and a communication system 36 that is configured to wirelessly communicate information to and from other entities 48, such as but not limited to, other vehicles ("V2V" communication), infrastructure ("V2I" communication), networks ("V2N" communication), pedestrian ("V2P" communication), remote transportation systems, and/or user devices.

The sensor system 28 includes one or more sensing devices 40a-40n that sense observable conditions of the exterior environment and/or the interior environment of the autonomous vehicle 10. The sensing devices 40a-40n can include but are not limited to, radars, LiDAR, global positioning systems, optical cameras, thermal cameras, ultrasonic sensors, inertial measurement units, Ultra-Wideband sensors, and/or other sensors. The actuator system 30 includes one or more actuator devices 42a-42n that control one or more vehicle features such as, but not limited to, the propulsion system 20, the transmission system 22, the steering system 24, and the brake system 26.

The data storage device 32 stores data for use in automatically controlling the vehicle 10. The data storage device 32 may be part of the controller 34, separate from the controller 34, or part of the controller 34 and part of a separate system. The controller 34 includes at least one processor 44 and a computer-readable storage device or media 46. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

The processor 44 can be any custom made or commercially available processor, a central processing unit (CPU), a graphics processing unit (GPU), an auxiliary processor among several processors associated with the controller 34, a semiconductor-based microprocessor (in the form of a microchip or chipset), a macro processor, any combination thereof, or generally any device for executing instructions. The computer-readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of several known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34.

The programming instructions may include one or more separate programs, each of which comprises an ordered listing of executable instructions for implementing logical functions. The one or more instructions of the controller 34, when executed by the processor 44, may configure the vehicle 10 to execute a tether operating mode.

Figure 2:
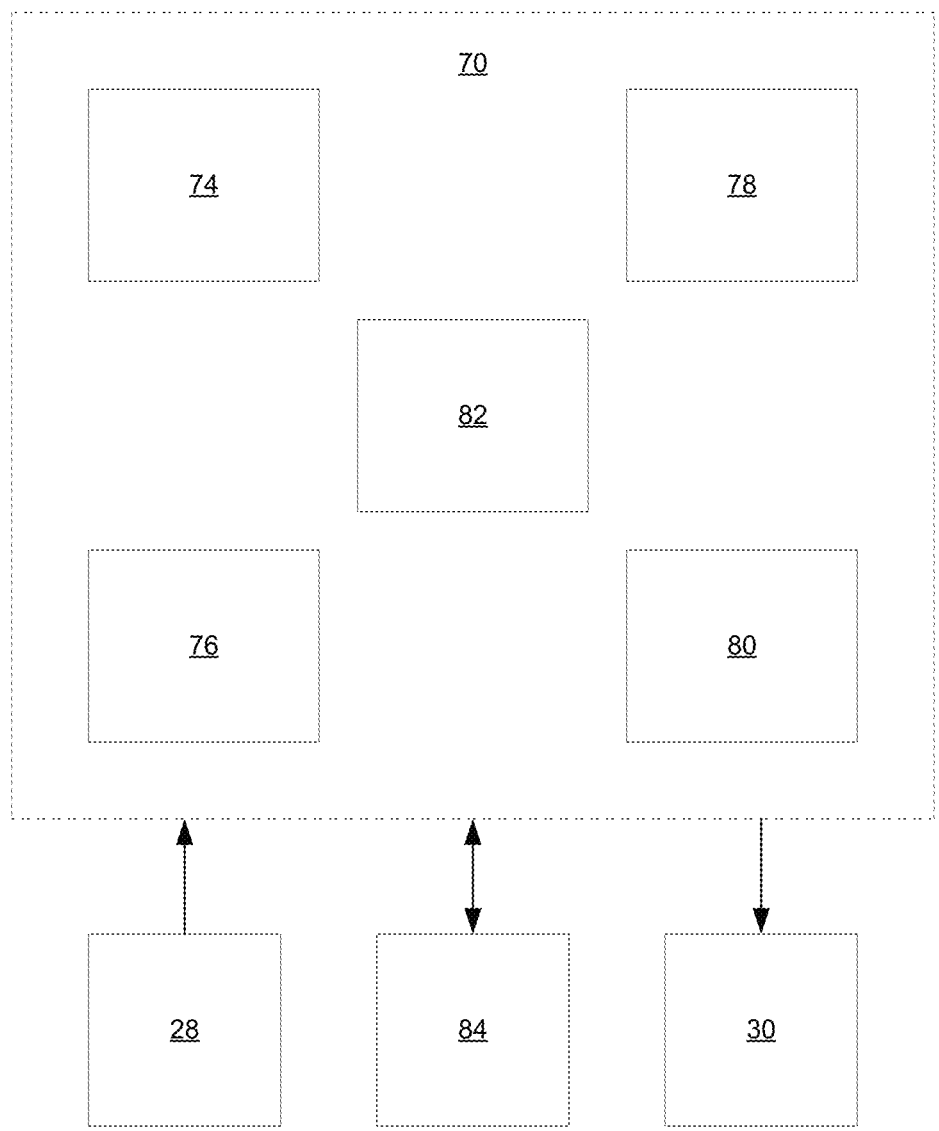
FIG. 2 is a functional block diagram illustrating an example driver assistance system, in accordance with various embodiments.

FIG. 2 is a block diagram depicting an example of the autonomous driving system (ADS) 70 implemented by the controller 34. Suitable software (e.g., programming instructions) and hardware components (e.g., processor 44 and computer-readable storage device or media 46) of controller 34 are utilized to provide the ADS 70. The example ADS 70 includes a perception system 74, a positioning system 76, a path planning system 78, a vehicle control system 80, and a vehicle tether system 82. As can be appreciated, in various embodiments, the software and hardware components of the ADS 70 may be organized into any number of systems (e.g., combined, further partitioned, etc.) and the disclosure is not limited to the present examples.

The example ADS 70 implements semi-autonomous driver assistance features to enable hands-free driving in many operating scenarios. The example ADS 70 can react to permanent traffic control devices, follow internal navigation routes, maintain headway (the average interval of time and/or between vehicles moving in the same direction), follow speed limits, support automatic and on-demand lane change, support left and right-hand turns, support close object avoidance, and support parking in residential driveways, among other things.

The example ADS 70 has multiple modes of operation, including a route following operating mode, an infinite route operating mode, and a vehicle tether operating mode, among others. In the route following operating mode, the example ADS 70 can direct a host vehicle (e.g., the vehicle 10) to follow an internal navigation route. In the infinite route operating mode, the example ADS 70 can direct a host vehicle (e.g., the vehicle 10) to follow a roadway, such as using a lane centering algorithm. In the vehicle tether operating mode, the example ADS 70 modifies vehicle driving behavior to make it easier for a following vehicle to follow the host vehicle (e.g., the vehicle 10).

The perception system 74 synthesizes and processes acquired sensor data from sensor system 28 and predicts the presence, location, classification, and/or path of objects and features of the environment of the host vehicle 10. In various embodiments, the perception system 74 can incorporate information from multiple sensors from sensor system 28, including but not limited to cameras, radars, and LiDAR, and/or any number of other types of sensors.

The positioning system 76 processes sensor data from sensor system 28 along with other data to determine a position (e.g., a local position relative to a map, an exact position relative to a lane of a road, a vehicle heading, etc.) of the host vehicle 10 relative to the environment. As can be appreciated, a variety of techniques may be employed to accomplish this localization, including, for example, simultaneous localization and mapping (SLAM), particle filters, Kalman filters, Bayesian filters, and the like.

The path planning system 78 processes sensor data from sensor system 28 along with other data to determine a desired path or trajectory for the host vehicle 10 to follow. The path planning system 78 determines a desired trajectory based on the active ADS operating mode employed in the vehicle 10.

The vehicle control system 80 generates control signals for controlling the vehicle 10 according to the determined path. In particular, the vehicle control system 80 generates control signals (e.g., steering control signals, acceleration control signals, braking control signals) for the actuator system 30 to direct the vehicle 10 to follow the desired trajectory determined by the path planning system 78.

The vehicle tether system 82 interacts with a Human Machine Interface (HMI) 84 to allow an operator of vehicle 10 to accept or reject a request from a potential following vehicle to follow the vehicle 10, and to accept or reject a request to allow the following vehicle to be virtually tethered to the vehicle 10. The vehicle tether system 82 facilitates the ADS 70 transitioning from an internal navigation route operating mode or an infinite route operating mode to a tether operating mode. The vehicle tether system 82 provides status information to a lead vehicle operator via the HMI 84 regarding implementation of the tether operating mode and provides following vehicle tracking data from the perception system 74 for use by the path planning system 78 when determining a desired trajectory.

The HMI 84 is responsive to the ADS 70 for presenting information to the host vehicle operator and that communicates when a host vehicle operator (e.g., driver) needs to be in control of the host vehicle 10. The HMI 84 may be incorporated in a vehicle dashboard and may provide a display of the host vehicle environment directly in the driver's line of sight. The HMI 84 may incorporate touchscreen technology for allowing a host vehicle operator to enter selections. The HMI 84 may incorporate vehicle speaker systems to provide aural alerts and messages to the host vehicle operator.

In various embodiments, the controller 34 implements machine learning techniques to assist the functionality of the ADS 70, such as feature detection/classification, obstruction mitigation, route traversal, mapping, sensor integration, ground-truth determination, and the like.

Figure 3:
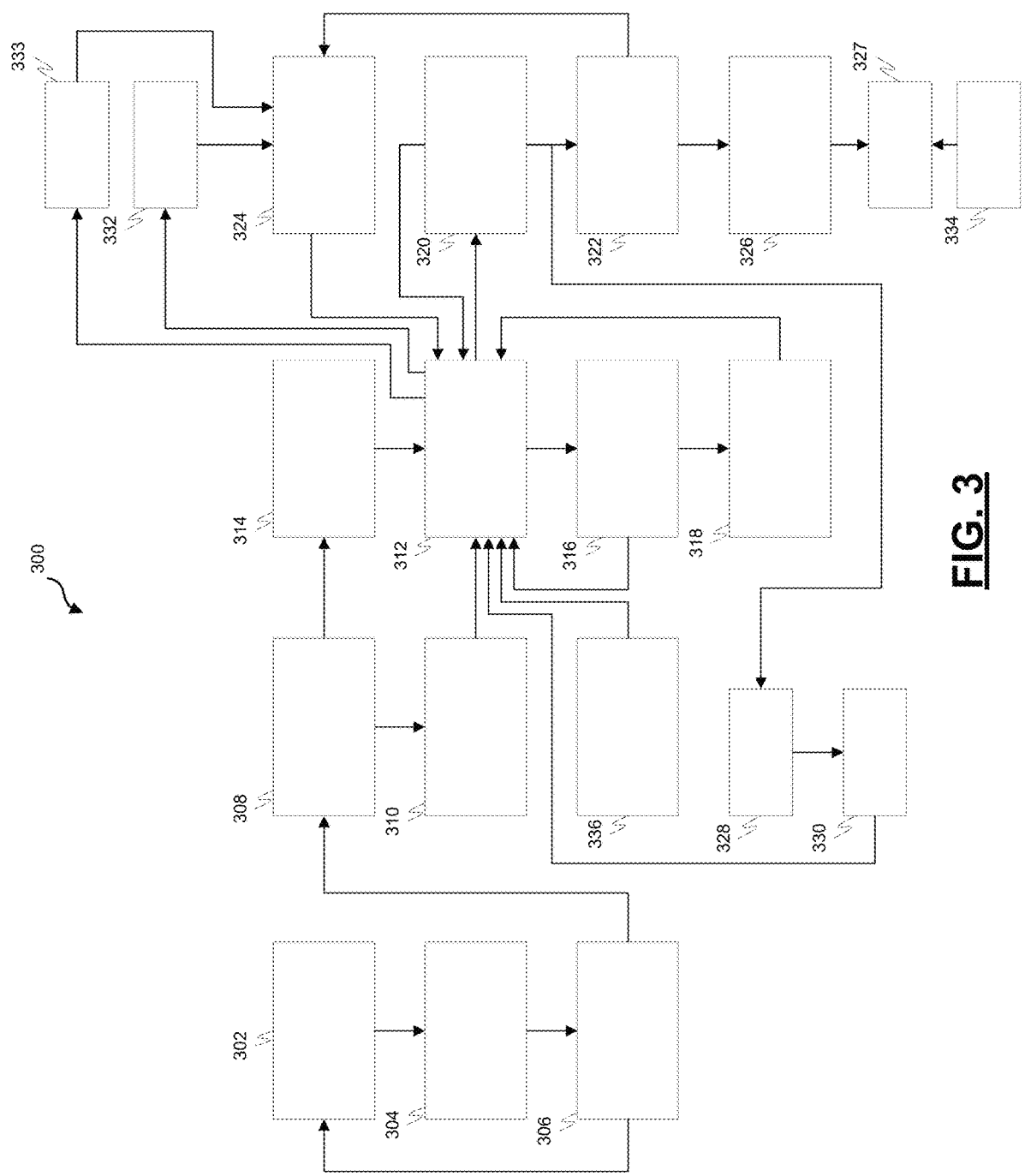
FIG. 3 is a process flow chart depicting an example process for implementing a tether operating mode by a driver assistance system, in accordance with various embodiments.

FIG. 3 is a process flow chart depicting an example process 300 for implementing a tether operating mode by a driver assistance system (e.g., the ADS 70, which is implemented by the processor of the controller 34). The order of operation within process 300 is not limited to the sequential execution as illustrated in the FIG. 3 but may be performed in one or more varying orders as applicable and in accordance with the present disclosure. Process 300 is described in connection with FIGS. 4A-4G, wherein FIGS. 4A-4G depict example interface screens of an example HMI provided by an example ADS to communicate information to a lead vehicle operator.

The example process 300 includes, at operation 302, determining whether an automated driver assistance feature that is compatible with a tether operating mode is active. In various embodiments, compatible automated driver assistance features include an internal navigation route operating mode or an infinite route operating mode. When a compatible automated driver assistance feature is active, the example process 300 includes proceeding to operation 304.

At operation 304, the example process 300 includes determining whether a request to tether from a following vehicle has been received and acting upon the request. In various embodiments, when a request to tether from a following vehicle is received (e.g., via a V2V communication from the following vehicle received at a V2V interface), a request to be followed indication is presented to the vehicle operator, via the HMI, for vehicle operator acceptance. In an example of a request to be followed indication being presented to the vehicle operator, FIG. 4A depicts an example interface screen 402 of an example HMI with a map view 404 of a route followed by the vehicle, and an example request to be followed indication in the form of a message 406 stating "Request to be followed. Do you Accept?" The vehicle operator, in this example, has the option of accepting or rejecting the request via touch selection. In various embodiments, touch selection may be implemented by providing buttons or other selection indicators that can be selected by vehicle operator touch. If the vehicle operator has not accepted the request to be followed (no at operation 304), the example process 300 returns to operation 302.

At operation 306, the example process 300 includes determining whether the vehicle operator has accepted the request to tether. In various embodiments, after a request to be followed has been accepted, a request to engage in vehicle trajectory behavior that facilitates vehicle following is presented to the vehicle operator, via the HMI, for vehicle operator acceptance. In an example of a request to engage in vehicle trajectory behavior that facilitates vehicle following, FIG. 4B depicts an example interface screen 412 of an example HMI with a map view 414 of a route followed by the vehicle 10, and an example request to engage in vehicle trajectory behavior that facilitates vehicle following in the form of a message 416 stating "Following Vehicle tethered. Allow Following behavior?" The vehicle operator, in this example, has the option of accepting or rejecting the request via touch selection. In various embodiments, touch selection may be implemented by providing buttons or other selection indicators that can be selected by vehicle operator touch. If the vehicle operator has not accepted the request to engage in vehicle trajectory behavior that facilitates vehicle following (no at operation 306), the example process 300 returns to operation 302.

In various embodiments, when the vehicle operator has accepted the request to engage in vehicle trajectory behavior that facilitates vehicle following (yes at operation 306), a tether mode active indication is presented to the vehicle operator, via the HMI 84. In an example of a tether mode active indication, FIG. 4C depicts an example interface screen 422 of an example HMI with a map view 424 of a route followed by the vehicle 10, and an example tether mode active indication in the form of a message 426 stating "Tether Mode Active." The example process 300 proceeds to operation 308.

At operation 308, the example process 300 includes determining whether the following vehicle is in the current lane of the lead vehicle (e.g., using sensor data from vehicle sensors from the sensor system 28). When the following vehicle is in the current lane of the lead vehicle 10 (yes at operation 308), the automated driver assistance feature, at operation 310, requires a far headway between the lead vehicle and the following vehicle before making an elective lane change, and at operation 312 proceeds towards a route objective (e.g., following a route to a destination). When the following vehicle is not in the current lane of the lead vehicle 10 (no at operation 308), then the automated driver assistance feature, at operation 314, prioritizes making a lane change so that the following vehicle is in the same lane as the lead vehicle 10 for tether operation, and at operation 312 proceeds towards the route objective (e.g., following a route to a destination).

At operation 316, the example process 300 includes determining whether the lead vehicle is approaching an intersection. In various embodiments, the determining is made based on a combination of map data (e.g., understanding that there are cross streets) and perception data (e.g., detecting traffic light, stop bar, etc.). When not approaching an intersection (no at operation 316), the example process 300 includes proceeding to operation 312. When approaching an intersection (yes at operation 316), the automated driver assistance feature (e.g., ADS 70), at operation 318, causes the lead vehicle to slow down to close the headway between the lead vehicle and the following vehicle and to consider the following vehicle when determining whether to proceed through the intersection. In various embodiments, the automated driver assistance feature uses the perception system to detect traffic light status (e.g., green, yellow, red) as well as infer status based on actors around the vehicle. In various embodiments, part of the decision to proceed is based on the status and whether the following vehicle will also be able to travel through the traffic light. By closing the gap and understanding the status (stale green, fresh green, fresh yellow, stale yellow) the automated driver assistance feature can determine the likelihood of the following vehicle also making it through the intersection. The automated driver assistance feature can shift the point of no return and allow for more deceleration to stop for a yellow light if the automated driver assistance feature knows that the following vehicle will not be able to go through the yellow light.

In various embodiments, the automated driver assistance feature will cause the lead vehicle 10 to stop earlier for yellow lights when in a tether operating mode. In an example, the automated driving assistance feature when in a tether operating mode may cause the lead vehicle 10 to stop when approaching an intersection when the vehicle 10 is at a first predetermined distance away from the center of the intersection when the yellow light is sensed that is longer than a second predetermined distance away from the center of the intersection when the yellow light is sensed that the automated driving assistance feature uses when not in a tether operating mode. In various embodiments, the first predetermined distance and the second predetermined distance are calculated based on a calculating a "point of no return" for the host vehicle and tethered vehicle (e.g., the point at which the vehicle needs to make a decision on whether to proceed through the light or not based on acceleration/deceleration profiles). In various embodiments, these profiles are based on "comfort" decelerations not maximum so the lead vehicle can choose to stop with a more aggressive profile if the following vehicle has not reached its point of no return.

At operation 320, the example process 300 includes determining whether the headway is greater than a preset tether goal plus a first predetermined percentage (e.g., 50%) of the tether goal. When the headway is less than or equal to the tether goal plus the first predetermined percentage of the tether goal (no at operation 320), then the process 300 includes proceeding to operation 312.

When the headway is greater than the tether goal plus the first predetermined percentage of the tether goal (yes at operation 320), then the example process 300 includes determining whether the headway is greater than the tether goal plus a second predetermined percentage (e.g., 100%) of the tether goal. When the headway is greater than the tether goal plus the first predetermined percentage of the tether goal and less than or equal to the tether goal plus the second predetermined percentage of the tether goal (no at operation 322), then the process 300 includes, at operation 324, alerting the lead vehicle operator of the increasing headway (e.g., by a graphical indicator on the HMI). When the headway is greater than the tether goal plus the second predetermined percentage of the tether goal, then the example process 300 includes, at operation 326, ending the tether operating mode and alerting the lead vehicle operator that the tether operating mode has ended.

In various embodiments, when the headway is greater than the tether goal plus the second predetermined percentage of the tether goal, a following vehicle lost indication is presented to the vehicle operator, via the HMI. In an example of a following vehicle lost indication, FIG. 4D depicts an example interface screen 432 of an example HMI with a map view 434 of a route followed by the vehicle, and an example following vehicle lost indication in the form of a message 436 stating "Following Vehicle Lost—Ultra Cruise Resumes."

In various embodiments, if a headway between the lead vehicle and following vehicle is subsequently established (e.g., via tracking by the perception system 74) as being less than the tether goal plus the second predetermined percentage of the tether goal, then an option to resume the tether operating mode is presented to the vehicle operator, via the HMI 84. In an example of an option to resume the tether operating mode presented to the vehicle operator, FIG. 4E depicts an example interface screen 442 of an example HMI with a map view 444 of a route followed by the vehicle 10, and an example option to resume tether mode indication presented to the vehicle operator in the form of a message 446 stating "Tether Re-Acquired-Allow Following?".

In various embodiments, the ADS 70 of the host vehicle 10 is configured to receive, via a V2V communication interface, a request to be followed from a following vehicle. In various embodiments, the vehicle tether system 82 is configured to interact with the HMI 84 to provide a request be followed indication to the lead vehicle operator, allow the lead vehicle operator to select or reject the request to be followed from the following vehicle, receive lead vehicle operator acceptance or rejection of the request to be followed, and cause the ADS 70 to communicate to the following vehicle (e.g., via V2V communication) that the request has been accepted or rejected.

In various embodiments, the vehicle tether system 82 is configured to interact with the HMI 84 to allow the lead vehicle operator to select or reject a request to enter a tether operating mode responsive to acceptance of the request to be followed. In various embodiments, the vehicle tether system 82 is configured to cause the ADS 70 to enter the tether operating mode and select a tether goal (e.g., close headway, medium headway, or far headway measured in time or distance) between the lead vehicle and the following vehicle responsive to lead vehicle operator acceptance of the request to be tethered. In various embodiments, close headway may involve a 1 second time gap, medium headway may involve a 1.5 second time gap, and far headway may involve a 2 second time gap. In various embodiments during tether mode, headway time may be changed to prevent other actors from moving in between the two tethered vehicles. The lead vehicle can communicate its planned motion to the following vehicle so that the following vehicle can react faster than through the normal perception and sensing suite. Having a reduced reaction time and knowledge of future motion, the following vehicle can safely follow at a smaller headway. In various embodiments, the vehicle tether system 82 is configured to interact with the HMI 84 to provide a tether mode indication that indicates that the lead vehicle is in the tether operating mode.

In various embodiments, the request to be followed indication comprises a first graphical indication (e.g., message 406) displayed on an HMI display screen (e.g., interface screen 402). In various embodiments, the request to be tethered indication comprises a second graphical indication (e.g., message 416) displayed on an HMI display screen (e.g., interface screen 412). In various embodiments, the tether mode indication comprises a third graphical indication (e.g., message 426) displayed on an HMI display screen (e.g., interface screen 422).

In various embodiments, the vehicle tether system 82 is configured to cause the perception system 74 to monitor a headway (e.g., distance or time headway) between the lead vehicle and following vehicle using one or more of the onboard vehicle sensors (e.g., cameras, radars, LIDAR) and vehicle telematics (e.g., GPS) when in the tether operating mode. In various embodiments, headway monitoring is achieved by measuring the distance between vehicles using sensors (e.g., camera, lidar, radar) and understanding vehicle velocities. In various embodiments, headway is monitored continuously based on perception detections.

In various embodiments, the vehicle tether system 82 is configured to cause the ADS 70 to communicate navigational information (e.g., exits to take, roads to follow, distance to travel on current road, etc.) to the following vehicle when in the tether operating mode. In various embodiments, the vehicle tether system 82 presents a request to the vehicle operator, via the HMI for vehicle operator acceptance, to share navigational information with the following vehicle. In an example of a request to share navigational information, FIG. 4F depicts an example interface screen 452 of an example HMI with a map view 454 of a route followed by the vehicle, and an example request to share navigational information in the form of a message 456 stating "Share Navigation Destination?" The vehicle operator, in this example, has the option of accepting or rejecting the request via touch selection.

In various embodiments, the vehicle tether system 82 is configured to cause the ADS 70 to communicate planned trajectory information (e.g., upcoming maneuvers over next several (such as 10) seconds, the upcoming maneuvers may include maneuvers such as change lanes, slow down, sharp turn—types of maneuvers communicated to vehicle controls to control the vehicle) of the lead vehicle to the following vehicle when in the tether operating mode. In various embodiments, the vehicle tether system 82 presents a request to the vehicle operator, via the HMI for vehicle operator acceptance, to share trajectory information with the following vehicle. In an example of a request to share trajectory information, FIG. 4G depicts an example interface screen 462 of an example HMI with a map view 464 of a route followed by the vehicle, and an example request to share navigational information in the form of a message 466 stating "Share Trajectory Information?" The vehicle operator, in this example, has the option of accepting or rejecting the request via touch selection.

In various embodiments, the vehicle tether system 82 is configured to cause the path planning system 78 to adjust a preplanned trajectory calculated by the ADS 70 to facilitate the following vehicle obtaining and maintaining the tether goal when in the tether operating mode. In various embodiments, the vehicle tether system 82 is configured to cause the path planning system 78 to adjust a preplanned trajectory by one or more of modifying driving behavior of lead vehicle (e.g., slow down) when approaching an intersection; executing a lane change only when both vehicles can safely execute the lane change; stopping earlier for yellow lights (e.g., stop when approaching an intersection when the vehicle is at a first predetermined distance away from the center of the intersection when the yellow light is sensed that is longer than a second predetermined distance away from the center of the intersection when the yellow light is sensed that the automated driving assistance feature uses when not in the tether operating mode); reducing maximum longitudinal acceleration; limiting lane changes when following vehicle is in same lane; and encouraging lane changes when following vehicle is in an adjacent lane.

In various embodiments, the vehicle tether system 82 is configured to cause the path planning system 78 to modify ADS 70 operation in the lead vehicle based on a level at which the headway (e.g., distance or time headway) is greater than the tether goal when in the tether operating mode. In various embodiments, the vehicle tether system 82 is configured to cause the path planning system 78 to modify ADS 70 operation by one or more of providing, via the HMI, a first tether warning (operation 324) when the headway is at a first predetermined level (e.g., 50%) greater than the tether goal (yes at operation 320); limiting vehicle commanded acceleration (operation 330) when the headway is at a second predetermined level (e.g., 75%) greater than the tether goal (yes at operation 328); and disengaging from the tether operating mode (operation 327) when the headway is at a third predetermined level (e.g., 100%) greater than the tether goal (yes at operation 322). In various embodiments, the vehicle tether system 82 is configured to provide the first tether warning (operation 324) when one or more of a current set speed (operation 332) and a driver override (operation 333) are leading to increasing distance headway. In various embodiments, the vehicle tether system 82 is configured to provide a tether mode disengaged indication (operation 326) that indicates that the tether operating mode has been disengaged when the headway is at the third predetermined level (e.g., 100%) greater than the tether goal. In various embodiments, vehicle commanded acceleration is limited through the trajectories that are generated (e.g., how the vehicle should move through space as a function of time) and also limited based on how the control system will follow the trajectories in time.

In various embodiments, the vehicle tether system 82 is configured to cause the ADS 70 to exit the tether operating mode (operation 327) based on lead vehicle operator override action (operation 334) and/or the headway exceeding a certain level (operation 322). In various embodiments, the vehicle tether system 82 is configured to cause the ADS 70 to generate control signals for the vehicle actuators to control the lead vehicle to facilitate the following vehicle obtaining and maintaining the tether goal (operation 336).

Figure 5:
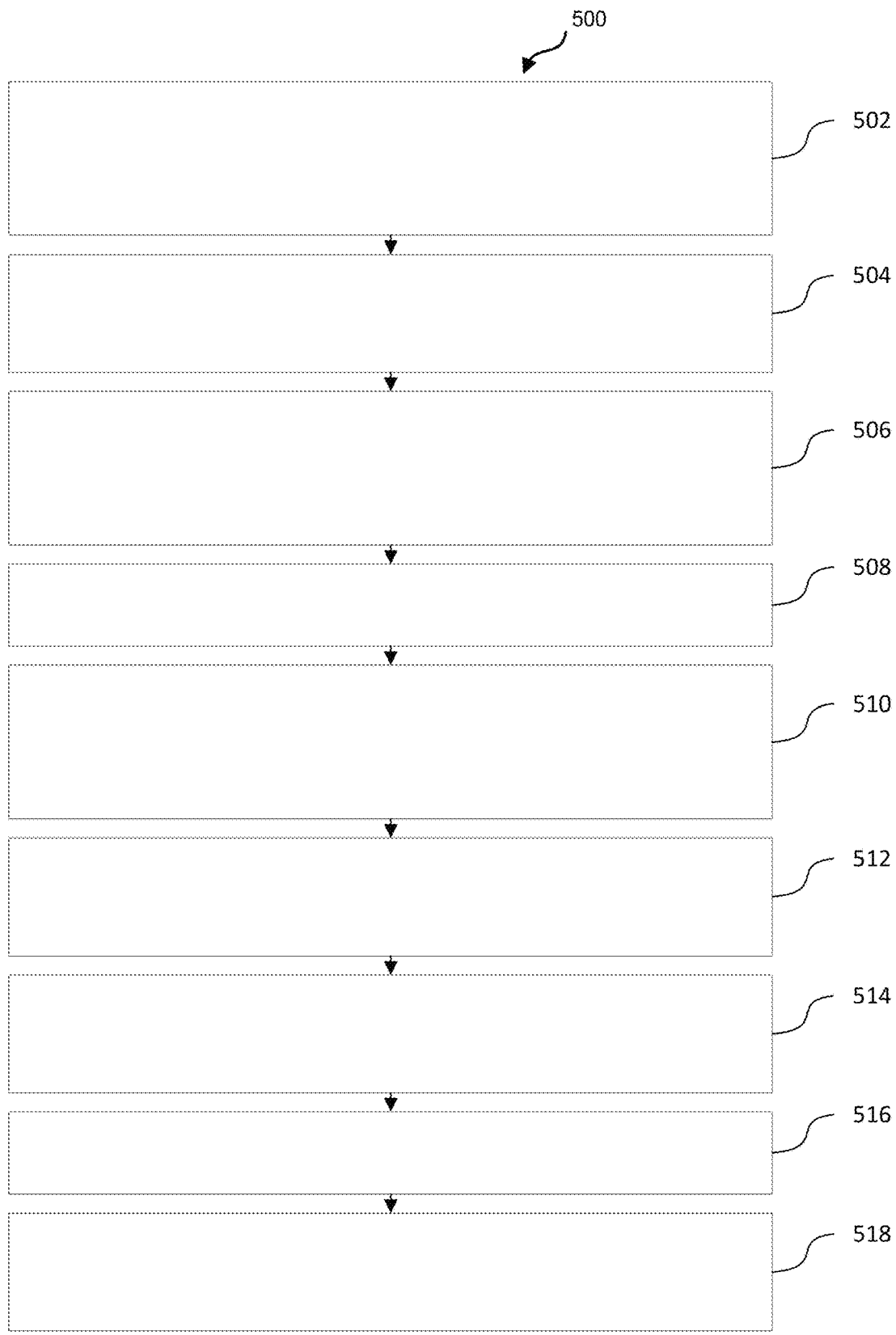
FIG. 5 is a process flow chart depicting an example process in a controller implemented driver assistance system in a host vehicle, in accordance with various embodiments.

FIG. 5 is a process flow chart depicting an example process 500 in a controller implemented driver assistance system in a lead vehicle. The order of operation within process 500 is not limited to the sequential execution as illustrated in the FIG. 5 but may be performed in one or more varying orders as applicable and in accordance with the present disclosure.

At operation 502, the example process 500 includes providing, via a human machine interface (HMI) in the lead vehicle for lead vehicle operator acceptance, a request to be followed indication responsive to receipt of a request to be followed from a following vehicle.

At operation 504, the example process 500 includes providing, via the HMI for lead vehicle operator acceptance, a request to enter a tether operating mode responsive to acceptance of the request to be followed.

At operation 506, the example process 500 includes entering the tether operating mode and selecting a tether goal between the lead vehicle and the following vehicle responsive to lead vehicle operator acceptance of the request to be tethered.

At operation 508, the example process 500 includes providing, via the HMI, a tether mode indication that indicates that the lead vehicle is in the tether operating mode.

At operation 510, the example process 500 includes monitoring a headway (e.g., distance or time headway) between the lead vehicle and following vehicle using one or more onboard vehicle sensors (e.g., cameras, radars, LIDAR) and vehicle telematics (e.g., GPS) when in the tether operating mode.

At operation 512, the example process 500 includes adjusting a preplanned trajectory calculated by a driver assistance system (e.g., path planning system 78) in the lead vehicle to facilitate the following vehicle obtaining and maintaining the tether goal when in the tether operating mode. In various embodiments, adjusting a preplanned trajectory calculated by a driver assistance system includes one or more of: modifying driving behavior of the lead vehicle when approaching an intersection; executing a lane change only when both the lead vehicle and the following vehicle can safely execute the lane change; stopping earlier for yellow lights; reducing maximum longitudinal acceleration; limiting lane changes when the following vehicle is in same lane; and encouraging lane changes when the following vehicle is in an adjacent lane.

At operation 514, the example process 500 includes modifying driver assistance system operation (e.g., path planning system 78 operation) in the lead vehicle based on a level at which the headway (e.g., distance or time headway) is greater than the tether goal when in the tether operating mode. In various embodiments modifying driver assistance system operation includes providing, via the HMI, a first tether warning when the headway is a first predetermined level greater than the tether goal; limiting vehicle commanded acceleration when the headway is a second predetermined level greater than the tether goal; and disengaging from tether operating mode when the headway is a third predetermined level greater than the tether goal.

At operation 516, the example process 500 includes generating control signals for vehicle actuators to control the lead vehicle to facilitate the following vehicle obtaining and maintaining the tether goal.

At operation 518, the example process 500 includes exiting the tether operating mode based on lead vehicle operator override action (e.g., operator selecting to end tether operating mode).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A lead vehicle configured to lead a following vehicle using maneuvering modifications assisting the following vehicle with following the lead vehicle, the lead vehicle comprising:
    a sensor system comprising onboard vehicle sensors;
    an actuator system comprising vehicle actuators;
    a human machine interface (HMI); and
    a controller for implementing a driver assistance system, the controller configured to:
        provide, via the HMI for lead vehicle operator acceptance, a request to be followed indication responsive to receipt of a request to be followed from the following vehicle;
        provide, via the HMI for lead vehicle operator acceptance, a request to enter a tether operating mode responsive to acceptance of the request to be followed wherein in the tether operating mode the lead vehicle is configured to make maneuvering modifications to assist the following vehicle with following the lead vehicle;
        enter the tether operating mode and select a tether goal between the lead vehicle and the following vehicle responsive to lead vehicle operator acceptance of the request to be tethered;
        provide, via the HMI, a tether mode indication that indicates that the lead vehicle is in the tether operating mode;
        monitor a headway between the lead vehicle and following vehicle using one or more of the onboard vehicle sensors and vehicle telematics;
        adjust a preplanned trajectory calculated by the driver assistance system to facilitate the following vehicle obtaining and maintaining the tether goal;
        modify driver assistance system operation in the lead vehicle based on a level at which the headway is greater than the tether goal when in the tether operating mode;
        exit the tether operating mode based on lead vehicle operator override action; and
        generate control signals for the vehicle actuators to control the lead vehicle to facilitate the following vehicle obtaining and maintaining the tether goal.

2. The lead vehicle of claim 1, wherein the controller is further configured to receive via a vehicle-to-vehicle (V2V) communication interface the request to be followed from the following vehicle.

3. The lead vehicle of claim 1, wherein:
    the request to be followed indication comprises a first graphical indication displayed on an HMI display screen;
    the request to be tethered indication comprises a second graphical indication displayed on an HMI display screen; and
    the tether mode indication comprises a third graphical indication displayed on an HMI display screen;
    wherein the first, second, and third graphical indications are different.

4. The lead vehicle of claim 1, wherein the controller is further configured to:
    receive lead vehicle operator acceptance of the request to be followed; and
    cause an acceptance of the request to be followed indication to be provided to the following vehicle.

5. The lead vehicle of claim 1, wherein the controller is further configured to:
    receive lead vehicle operator acceptance of the request to be tethered; and
    cause an acceptance of the request to be tethered indication to be provided to the following vehicle.

6. The lead vehicle of claim 1, wherein the controller is further configured to communicate planned trajectory information of the lead vehicle to the following vehicle.

7. The lead vehicle of claim 1, wherein the controller is further configured to communicate navigational information to the following vehicle when in the tether operating mode.

8. The lead vehicle of claim 1, wherein to adjust a preplanned trajectory the controller is configured to perform one or more of:
    generate control signals to modify speed of lead vehicle when approaching an intersection;

execute a lane change only when both vehicles can safely execute the lane change;
stop earlier for yellow lights;
reduce maximum longitudinal acceleration;
limit lane changes when following vehicle is in same lane; and
encourage lane changes when following vehicle is in an adjacent lane.

9. The lead vehicle of claim 1, wherein to modify driver assistance system operation based on a level at which the headway is greater than the tether goal the controller is configured to:
provide, via the HMI, a first tether warning when the headway is at a first predetermined level greater than the tether goal;
limit vehicle commanded acceleration when the headway is at a second predetermined level greater than the tether goal; and
disengage from tether operating mode when the headway is at a third predetermined level greater than the tether goal.

10. The lead vehicle of claim 1, wherein:
the request to be followed indication comprises a first graphical indication displayed on an HMI display screen;
the request to be tethered indication comprises a second graphical indication displayed on an HMI display screen; and
the tether mode indication comprises a third graphical indication displayed on an HMI display screen, wherein the first, second, and third graphical indications are different;
to adjust a preplanned trajectory the controller is configured to:
generate control signals to modify speed of the lead vehicle when approaching an intersection;
execute a lane change only when both vehicles can safely execute the lane change; and
reduce maximum longitudinal acceleration;
to modify driver assistance system operation based on a level at which the headway is greater than the tether goal the controller is configured to:
provide, via the HMI, a first tether warning when the headway is at a first predetermined level greater than the tether goal;
limit vehicle commanded acceleration when the headway is at a second predetermined level greater than the tether goal; and
disengage from tether operating mode when the headway is at a third predetermined level greater than the tether goal;
to provide a first tether warning the controller is configured to provide, via the HMI, an alert that one or more of a current set speed and a driver override are leading to increasing distance headway; and
the controller is further configured to provide, via the HMI, a tether mode disengaged indication that indicates that the tether operating mode has been disengaged.

11. A method in a lead vehicle configured to lead a following vehicle using maneuvering modifications assisting the following vehicle with following the lead vehicle, the method comprising:
providing, via a human machine interface (HMI) in the lead vehicle for lead vehicle operator acceptance, a request to be followed indication responsive to receipt of a request to be followed from a following vehicle;
providing, via the HMI for lead vehicle operator acceptance, a request to enter a tether operating mode responsive to acceptance of the request to be followed wherein in the tether operating mode the lead vehicle is configured to make maneuvering modifications to assist the following vehicle with following the lead vehicle;
entering the tether operating mode and selecting a tether goal between the lead vehicle and the following vehicle responsive to lead vehicle operator acceptance of the request to be tethered;
providing, via the HMI, a tether mode indication that indicates that the lead vehicle is in the tether operating mode;
monitoring a headway between the lead vehicle and following vehicle using one or more onboard vehicle sensors and vehicle telematics when in the tether operating mode;
adjusting a preplanned trajectory calculated by a driver assistance system in the lead vehicle to facilitate the following vehicle obtaining and maintaining the tether goal when in the tether operating mode;
modifying driver assistance system operation in the lead vehicle based on a level at which the headway is greater than the tether goal when in the tether operating mode;
generating control signals for vehicle actuators to control the lead vehicle to facilitate the following vehicle obtaining and maintaining the tether goal; and
exiting the tether operating mode based on lead vehicle operator override action.

12. The method of claim 11, further comprising receiving receive via a vehicle-to-vehicle (V2V) communication interface the request to be followed from the following vehicle.

13. The method of claim 11, wherein:
the request to be followed indication comprises a first graphical indication displayed on an HMI display screen;
the request to be tethered indication comprises a second graphical indication displayed on an HMI display screen; and
the tether mode indication comprises a third graphical indication displayed on an HMI display screen.

14. The method of claim 11, further comprising:
receiving lead vehicle operator acceptance of the request to be followed; and
causing an acceptance of the request to be followed indication to be provided to the following vehicle.

15. The method of claim 11, further comprising:
receiving lead vehicle operator acceptance of the request to be tethered; and
causing an acceptance of the request to be tethered indication to be provided to the following vehicle.

16. The method of claim 11, further comprising communicating planned trajectory information of the lead vehicle to the following vehicle when in the tether operating mode.

17. The method of claim 11, further comprising communicating navigational information to the following vehicle when in the tether operating mode.

18. The method of claim 11, wherein adjusting a preplanned trajectory comprises one or more of:
modifying driving behavior of lead vehicle when approaching an intersection;
executing a lane change only when both vehicles can safely execute the lane change;
stopping earlier for yellow lights;
reducing maximum longitudinal acceleration;

limiting lane changes when following vehicle is in same lane; and encouraging lane changes when the following vehicle is in an adjacent lane.

19. The method of claim 11, wherein modifying driver assistance system operation based on a level at which the headway is greater than the tether goal comprises:

providing, via the HMI, a first tether warning when the headway is a first predetermined level greater than the tether goal;

limiting vehicle commanded acceleration when the headway is a second predetermined level greater than the tether goal; and disengaging from tether operating mode when the headway is a third predetermined level greater than the tether goal.

20. A controller in a lead vehicle configured to lead a following vehicle, the controller configured to implement a driver assistance system that incorporates maneuvering modifications assisting the following vehicle with following the lead vehicle, the controller configured to:

provide, via a human machine interface (HMI) in the lead vehicle for lead vehicle operator acceptance, a request to be followed indication responsive to receipt of a request to be followed from a following vehicle;

provide, via the HMI for lead vehicle operator acceptance, a request to enter a tether operating mode responsive to acceptance of the request to be followed wherein in the tether operating mode the lead vehicle is configured to make maneuvering modifications to assist the following vehicle with following the lead vehicle;

enter the tether operating mode and select a tether goal between the lead vehicle and the following vehicle responsive to lead vehicle operator acceptance of the request to be tethered;

provide, via the HMI, a tether mode indication that indicates that the lead vehicle is in the tether operating mode;

monitor a headway between the lead vehicle and following vehicle using one or more onboard vehicle sensors and vehicle telematics when in the tether operating mode;

adjust a preplanned trajectory calculated by a driver assistance system in the lead vehicle to facilitate the following vehicle obtaining and maintaining the tether goal when in the tether operating mode;

modify driver assistance system operation in the lead vehicle based on a level at which the headway is greater than the tether goal when in the tether operating mode;

exit the tether operating mode based on lead vehicle operator override action; and generate control signals for vehicle actuators to control the lead vehicle to facilitate the following vehicle obtaining and maintaining the tether goal.

* * * * *